United States Patent
Kojima

[15] 3,659,883
[45] May 2, 1972

[54] COUPLING CONSTRUCTION AND IMPROVED PACKING RING THEREFOR

[72] Inventor: Noriatsu Kojima, Yanagishima-cho 5-chome No. 31, Nakagawa-ku, Nagoya, Japan

[22] Filed: Nov. 12, 1970

[21] Appl. No.: 88,695

[30] Foreign Application Priority Data

May 26, 1970 Japan..................................45/45043

[52] U.S. Cl............................................................285/348
[51] Int. Cl................................................................F16l 17/00
[58] Field of Search..................285/348, 346, DIG. 11, 338; 277/110

[56] References Cited

UNITED STATES PATENTS

| | | | |
|---|---|---|---|
| 546,732 | 9/1895 | Desserich | 285/DIG. 11 |
| 2,788,992 | 4/1957 | De Vienne et al. | 285/348 X |
| 2,610,870 | 9/1952 | Parmesan | 285/110 |
| 3,045,830 | 7/1962 | Fulton | 285/346 X |
| 2,163,810 | 6/1939 | Raybould | 285/348 X |
| 1,671,161 | 5/1928 | Perks | 285/346 |

FOREIGN PATENTS OR APPLICATIONS

| | | | |
|---|---|---|---|
| 1,144,915 | 4/1957 | France | 277/110 |
| 162,221 | 8/1933 | Switzerland | 285/DIG. 11 |

*Primary Examiner*—Andrew V. Kundrat
*Attorney*—McGlew & Toren

[57] ABSTRACT

A coupling construction includes a coupling sleeve fitted over two pipe ends which are to be joined together and which includes a widened end portion at each end for accommodating a packing between the sleeve and a associated pipe and an intermediate portion which is of substantially the same diameter as the diameter of the pipe to be connected. The coupling joint is formed by a packing ring placed within the widened diameter sleeve portion and which is stressed and tightened by a ring member having a surface which bears against a concave surface of the packing ring when a threaded nut is tightened to the coupling sleeve and is displaced axially by the tightening. The packing ring includes an interior surface having an internal groove and includes a concave shoulder at each end on its exterior. One external concave shoulder presses against a convex interior portion of the coupling sleeve and the other shoulder on the opposite end is engaged by a ring member which is displaced axially during tightening. When the joint is fully tightened the packing ring is deformed so that the groove area is reduced to force out the air in the groove and to effect a tight engagement of the ring with the associated pipe.

1 Claims, 2 Drawing Figures

INVENTOR
NORIATSU KOJIMA

BY
ATTORNEYS 3,659,883

COUPLING CONSTRUCTION AND IMPROVED PACKING RING THEREFOR

SUMMARY OF THE INVENTION

This invention relates in general to the construction of coupling joints and in particular to a new and useful coupling joint and packing therefor, the packing having an internal groove in a concave shoulder at each exterior side which is tightly compressed inwardly during the tightening of the coupling to cause a deformation of the groove and a displacement of the air therein.

The present invention is an improvement over the prior art inasmuch as it provides a coupling joint constructed to eliminate any leakage. This is accomplished in accordance with the invention by a ring packing having an internal groove therein which is deformed during the tightening of the coupling parts so as to form an air-tight seal in respect to the associated parts. The ring is engaged from respective opposite ends at the respective side shoulders by a coupling sleeve and by a fastening nut and engagement ring. A central groove of the ring is flattened into tight sealing engagement with the associated pipe part to be joined during the fastening by the tightening of the nut. This provides a suction engagement of the packing ring which prevents the packing from being disconnected after it is once fastened and it insures that the sealed conditions of the connecting joint are maintained.

Accordingly, it is an object of the invention to provide an improved coupling joint which includes a coupling sleeve adapted to fit over the two tubular elements to be joined together and which is widened at one end to accommodate a packing ring therein over the pipe to be joined and which includes a coupling nut which is secured to the coupling sleeve in a manner to deform the packing ring so that an interior groove thereof is tightly engaged with the associated pipe part to be joined.

A further object of the invention is to provide a packing ring for a coupling joint which includes an interior wall of the ring which is grooved centrally and which includes an exterior wall having a concave shoulder at each side for receiving the axially applied clamping force of the coupling joint.

A further object of the invention is to provide a coupling and a packing ring which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
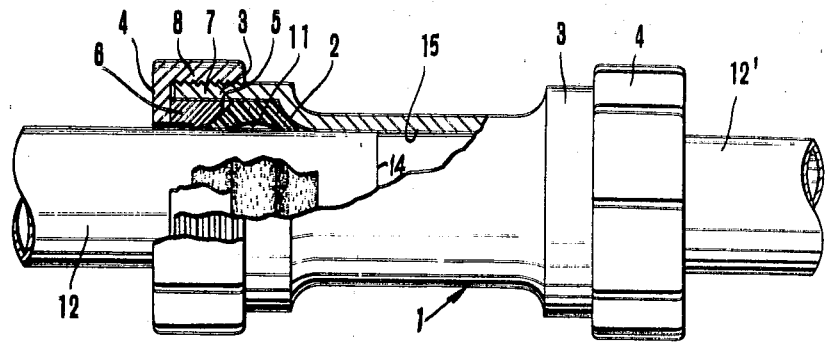
FIG. 1 is a partial axial sectional view and a partial side elevational view of a coupling joint constructed in accordance with the invention.
Figure 2:
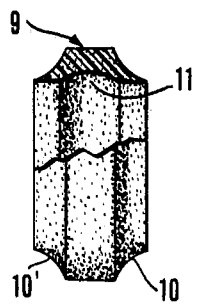
FIG. 2 is a partial side elevational and transverse sectional view of a packing ring constructed in accordance with the invention.

Referring to the drawings in particular, the invention embodied therein comprises a coupling joint for joining two tubular elements or pipes 12 and 12' together in axially aligned relationship with the use of a coupling sleeve generally designated 1 which fits over the parts to overlap each and to enclose the end of the tubular parts adjacent their abutting edges 14.

In accordance with the invention, the connecting sleeve 1 is provided with a widened or flanged end 3 which defines an interior space for the insertion of a packing ring generally designated 9 at the interior of the connecting sleeve and over one of the pipes 12 which are to be joined. The interior of the coupling sleeve 1 has an internal diameter 15 which is substantially the same as that of the exterior diameters of the pipes 12, 12' and a widened flange part 3 includes a convex-radius shoulder 2 which abuts against a concave radial shoulder 10 of the packing ring 9. A second concave radial shoulder 10' of the packing ring 9 is engaged by a convex outer end part 5 of a ring member 6. The coupling joint is tightened by the threading of a nut member 4 to cause internal threads 8 thereof to engage with external threads 7 defined on the coupling sleeve 1. During this threading and tightening of the coupling joint the ring member 6 is displaced against the shoulder 10' to cause the opposite shoulder 10 to bear tightly against the convex-radius shoulder 2 and further tightening of the nut member 4 causes a deformation and flattening of an internal groove 11 which is defined between the ends on the interior of the ring 9.

The pipe coupling or pipe joint has the feature that each end of the coupling sleeve 1 is provided with the flange portion 3 and there is a tight seal of the connecting joint through the ring 9 at each location.

Fastening of the nuts 4 causes a deformation of the packing ring 9 to an extent that the groove 11 becomes substantially adhesively secured to the associated pipe 12 due to the moving out of the air in the space of the groove 11 to cause a suction gripping engagement action. When a substantial portion of the air in the groove 11 is removed by the tightening action, there is a firm interengagement of the coupling parts and thus there is no possibility of leakage of fluid from either of the pipes 12 or 12'. In addition there is very little chance that either pipe 12 or 12' will become disconnected from the coupling joint.

A further feature of the coupling joint is the ease with which the coupling engagement may be effected merely by tightening the coupling nuts 4,4. The overall joint assembly is effected with a minimum of parts and the coupling may be effected easily and without time loss. The packing ring 9 is constructed such that upon the application of force in an axial direction through the tightening of the nut there is a radial tightening of the packing ring in respect to the associated pipe to be connected. The radius of the ring member 6 at the location 5 and the convex interior radius at the location 2 of the coupling sleeve 1 may be such that the angle between the external and/or the internal periphery and extension of the packing ring radius becomes 45°.

What is claimed is:

1. A coupling joint construction for joining two tubular elements in axially aligned relationship, comprises an elongated coupling sleeve arranged to fit over the elements to be joined and said coupling sleeve comprises a flange at least at one end and a sleeve portion extending axially from said flange, said sleeve portion having an internal diameter of substantially the same diameter as the outside diameter of the tubular elements to be joined, said flange projecting radially outwardly from said sleeve portion and having an axially extending length of its interior surface spaced radially outwardly from the interior surface of said sleeve portion and forming a cavity, the part of said flange extending from said sleeve portion forming a shoulder having a convex surface within the cavity formed by said flange, a packing ring positioned within the cavity and arranged to encircle one of the tubular elements to be joined, said packing ring extending in the axial direction of the coupling joint construction and having a radially inner surface and a radially outer surface, said packing ring having a shoulder with a concave surface at one end of its outer surface disposed in bearing contact with the shoulder formed in the cavity provided by said flange, said packing ring having another shoulder with a concave surface at the other end of its outer surface, a coupling nut disposed in threaded engagement with the radially outer surface of said flange, said coupling nut having a radially inwardly extending flange forming at least a partial closure over the end of the cavity formed by said flange on said coupling sleeve, a ring member positioned within the cavity formed by said flange on said coupling sleeve and extending between said flange on said coupling nut and said packing ring, said ring member having a convex surface at one end in bearing contact with said another shoulder on said packing ring, said packing ring having an annularly extending groove formed in its inner surface and the groove being spaced from the edges of the inner surface, so that as said coupling nut is threaded onto said flange of said coupling sleeve, said flange on said coupling nut forces said ring member against said packing ring which, in turn, is forced against said shoulder on said flange of said coupling sleeve and effects a radially inwardly directed force flattening the groove in the inner surface of said packing ring whereby a suction action can be provided with the tubular part on which said packing ring is positioned.

* * * * *